United States Patent [19]
Washizu

[11] Patent Number: 5,192,040
[45] Date of Patent: Mar. 9, 1993

[54] PIPING/WIRING CLAMPING DEVICE

[75] Inventor: Katsushi Washizu, Numazu, Japan

[73] Assignee: Usui Kokusai Sangyo Kaisha Ltd., Japan

[21] Appl. No.: 811,802

[22] Filed: Dec. 20, 1991

[30] Foreign Application Priority Data

Dec. 12, 1990 [JP] Japan ................. 2-413296

[51] Int. Cl.⁵ ............................................. F16L 3/08
[52] U.S. Cl. ............................ 248/74.5; 174/163 R; 248/71
[58] Field of Search ................... 248/65, 68.1, 74.1, 248/74.3, 74.5, 71; 174/163 R; 24/17 AP, 273, 277, 16 PB

[56] References Cited

U.S. PATENT DOCUMENTS

| | | | |
|---|---|---|---|
| 2,351,790 | 6/1944 | Tinnerman | 248/74.3 |
| 2,683,578 | 7/1954 | Rainey | 174/163 R X |
| 3,080,140 | 3/1963 | Gohs | 248/74.1 |
| 3,906,592 | 9/1975 | Sakasegawa | 248/74.3 X |
| 3,995,795 | 12/1976 | Hogan | 248/68.1 |
| 4,441,677 | 4/1984 | Byerly | 248/74.3 |
| 5,004,194 | 4/1991 | Watanabe | 174/163 R X |

*Primary Examiner*—J. Franklin Foss
*Attorney, Agent, or Firm*—Anthony J. Casella; Gerald E. Hespos

[57] ABSTRACT

Herein disclosed is a piping/wiring clamping device which has a simple structure but can fix a piping/wiring element stably while allowing a tentative fixing. The clamping device comprises: a clamping wall formed by curing a band generally at its center for clamping at least one piping/wiring element fixedly; a pair of mounting walls which are formed to extend continuously from the two ends of the clamping wall and at least one of which is arcuated; engaging means formed at the extending end portions of the mounting walls for engaging with each other at their ends when the two extending end portions are pressed toward each other; and mounting holes individually formed in the mounting walls and adapted to overlap each other when the mounting walls are held in contact with each other. The two ends of the engagement means are brought into engagement with each other to hold the elasticity of one of the mounting walls with respect to the other when the extending end portions of the mounting walls are pressed to contact with each other while holding the one piping/wiring element. The end portion of the one mounting wall further pushes and fixes the piping/wiring element on the clamping wall, as the one mounting wall is pushed against the elasticity of the other mounting wall, to fix the element on a stationary portion through the mounting holes.

6 Claims, 3 Drawing Sheets

PRIOR ART

PIPING/WIRING CLAMPING DEVICE

BACKGROUND OF THE INVENTION

1. Field of the Invention

The present invention relates to a piping/wiring clamping device for clamping thin pipes having a diameter of 20 mm or less to be assembled in an automobile or other various apparatus for supplying oil or air and a bundle of wiring lines.

2. Description of the Prior Art

In an engine room of an automobile, for example, there are arranged a number of relatively thin oiling pipes and electric wiring lines. Fixing clamps have heretofore been used for holding those pipes and wiring lines. FIG. 8 is an explanatory view showing the fixing clamp of that kind according to the prior art. As shown, a band bracket 1 has its one end portion curled to clamp a pipe 2, for example, in the curled portion 6.

In the aforementioned fixing clamp of the prior art, a spring-back occurs, even if the bracket 1 is rather intensely curled to hold the pipe 2, so that the pipe 2 is not reliably fixed in and around the longitudinal axis but may be displaced. For complete fixing, therefore, the pipe 2 has to be soldered to cause problems in the thermal deterioration and in a rise in the cost due to the surface treatment.

SUMMARY OF THE INVENTION

The present invention has been conceived in view of the aforementioned status of the fixing clamp of this kind and has an object to provide a piping/wiring clamping device which has a simple structure but can fix a piping/wiring element stably while allowing a tentative fixing.

In order to achieve the above-specified object, according to the present invention, there is provided a piping/wiring clamping device which comprises: a clamping wall formed by curing a band generally at its center for clamping at least one piping/wiring element fixedly; a pair of mounting walls which are formed to extend continuously from the two ends of the clamping wall and at least one of which is arcuated; engaging means formed at the extending end portions of the mounting walls for engaging with each other at their ends when the two extending end portions are pressed toward each other; and mounting holes individually formed in the mounting walls and adapted to overlap each other when the mounting walls are held in contact with each other. The two ends of the engagement means are brought into engagement with each other to hold the elasticity of one of the mounting walls with respect to the other when the extending end portions of the mounting walls are pressed to contact with each other while holding the one piping/wiring element. The end portion of the one mounting wall further pushes and fixes the piping/wiring element on the clamping wall, as the one mounting wall is pushed against the elasticity of the other mounting wall, to fix the element on a stationary portion through the mounting holes.

According to the present invention, the band is curved generally at its center to form the clamping wall. If, with the clamping wall holding at least one piping/wiring element, the extending end portions of the paired mounting walls which extend from the two ends of the clamping wall and at least one of which is curved are pressed toward each other, they are brought into engagement with each other. Since, moreover, one of the mounting walls is arranged while holding elasticity with respect to the other, the end portion of the one mounting wall further pushes and fixes the element on the clamping wall, if the one mounting wall is pushed against the elasticity of the other by fastening a bolt or the like, so that the clamping device fixes the element on a stationary portion.

BRIEF DESCRIPTION OF THE DRAWINGS

FIG. 1 is an explanatory view showing the state in which engaging means are released;

FIG. 2 is an explanatory view showing a tentative fixed state; and

FIG. 3 is an explanatory view showing the state in which a piping/wiring element is fixed.

FIG. 4 is an explanatory view showing the state in which engaging means are released;

FIG. 5 is an explanatory view showing a tentative fixed state; and

FIG. 6 is an explanatory view showing the state in which a piping/wiring element is fixed.

DETAILED DESCRIPTION OF THE PREFERRED EMBODIMENTS

The present invention will be described in connection with the embodiments thereof with reference to FIGS. 1 to 7.

Figure 1:
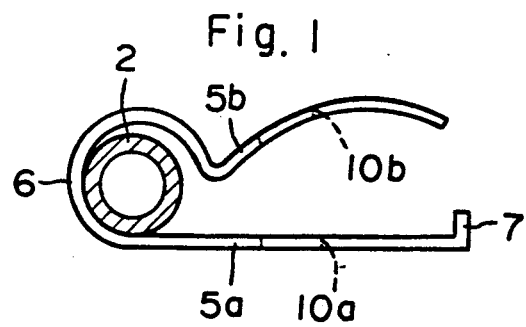
In FIGS. 1 to 3 are explanatory views showing one embodiment of the present invention.
Figure 2:
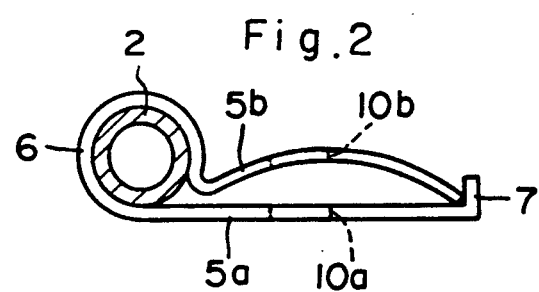
Figure 3:
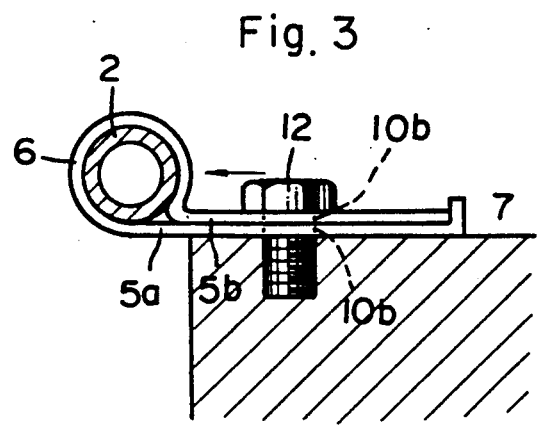

In FIGS. 1 to 3 showing the first embodiment, reference numeral 6 designates a clamping wall forming the clamping device, which is formed by curving a metallic band generally at its center. This embodiment corresponds to the case, in which one pipe 2 is fixed held by the clamping wall 6. This clamping wall 6 is so curved to engage and press the circumference of the pipe 2 in its final clamping state. From the two ends of this clamping wall 6, there are continuously extended a pair of mounting walls 5a and 5b, one 5b of which has an elasticity and is made slightly longer than the other mounting wall 5a and which is arcuated apart from the other wall 5a while holding the elasticity. These mounting walls 5a and 5b are individually formed with mounting holes 10a and 10b.

The extending end portion of the mounting wall 5a is bent at a right angle toward the other mounting wall 5b to form an engaging ear 7, with which the end portion of the mounting wall 5b can come into elastic engagement. Thus, if the end portion of the mounting wall 5b is elastically moved toward the mounting mounting wall 5a and into engagement with the engaging ear 7 from the state of FIG. 1 in which the pipe 2 is inserted and held in the clamping wall 6, the mounting walls 5a and 5b come into engagement with each other, as shown in FIG. 2, to clamp the pipe 2 tentatively, and the mounting holes 10a and 10b come generally into alignment.

Moreover, the final mounting position of the pipe 2 in this tentative state is set with respect to another pipe or wiring line, and a bolt 12 fitted in the mounting holes 10a and 10b is then fastened to press the mounting wall 5b against the elasticity toward the mounting wall 5a until the two mounting walls 5a and 5b contact with each other. At this time, the clamping wall 6 is further pressed onto the pipe 2, as indicated by arrow in FIG. 3, by the elastic force of the mounting wall 5b so that the pipe 2 is stably fixed in position by the clamp device.

Thus, the first embodiment is simple in construction and advantageous in production cost and is enabled to clamp the piping/wiring element stably and fixedly by the simple actions of bringing the end portion of the mounting wall 5b into engagement with the engaging ear 7 and into the tentative fixed state and moving the mounting wall 5b toward the mounting wall 5a against the elasticity. Even if transported in the tentative state, the piping/wiring element is stably fixed without any positional displacement.

Figure 4:
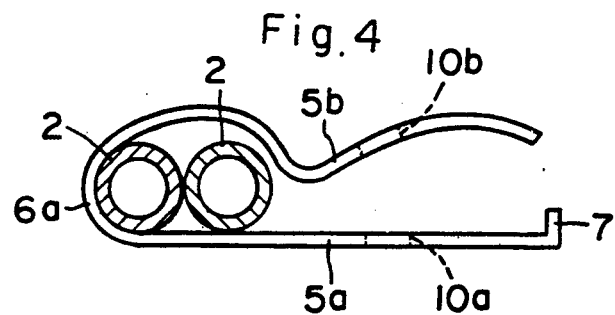
In FIGS. 4 to 6 are explanatory views showing one embodiment of the present invention.
Figure 5:
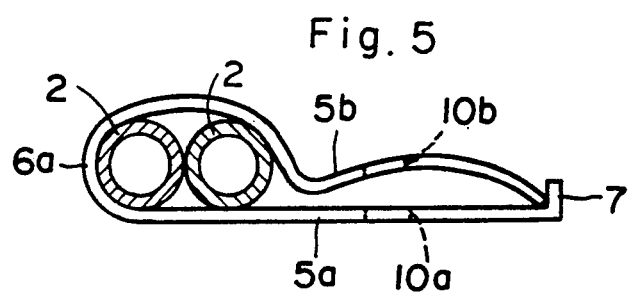
Figure 6:
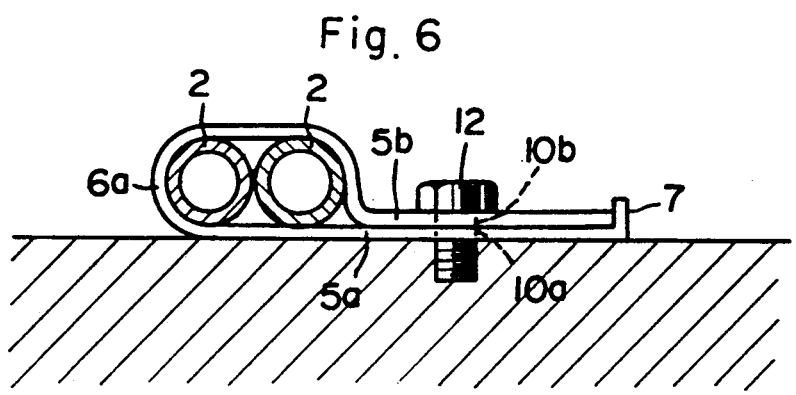

In a second embodiment, as shown in FIGS. 4 to 6, a clamping wall 6a is so shaped that it can hold two piping/wiring elements fixedly. The second embodiment is identical to the first one in the construction of the remaining portions and in the operations and effects.

Figure 7:
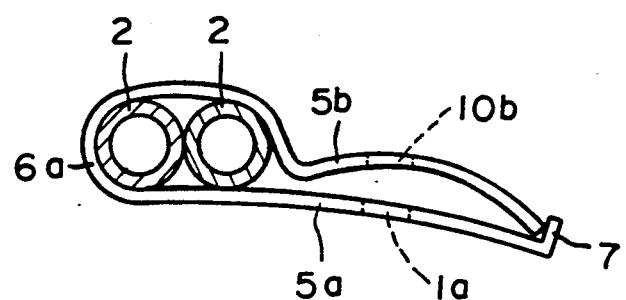
FIG. 7 is a view corresponding to FIG. 5 but shows still another embodiment.
Figure 8:
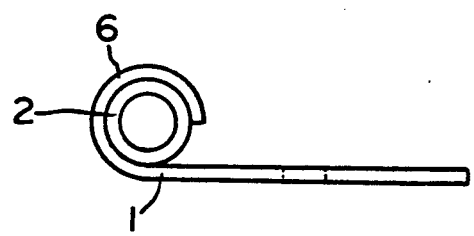
FIG. 8 is an explanatory view showing the clamp of this kind of the prior art.

Incidentally, the foregoing embodiments are exemplified by forming the mounting wall 5a into a flat wall but can be curved likewise the mounting wall 5b, as shown in FIG. 7. In this modification, too, the elements are fixedly held, as shown in FIG. 6, by fastening the bolt 12.

According to the present invention, the clamping wall is formed at its two sides with the paired mounting walls having the engaging means at their leading ends, and one mounting wall is arcuated apart from the other mounting wall while holding its elasticity when their leading ends are caused to engage with each other by the engaging means. As a result, if one mounting wall is pressed toward the other by fastening the bolt or the like, the piping/wiring element or elements can be stably and fixedly held with ease in the clamping wall. Since no soldering treatment is required, the clamping device experiences no thermal deterioration and requires no surface treatment.

What is claimed is:

1. A piping/wiring clamping device formed from an elongated band of resiliently flexible material having opposed first and second ends, a substantially planar engaging ear disposed at the first end of the band, an elongated first mounting wall extending substantially orthogonally from the engaging ear, the first mounting wall having a first mounting hole spaced a selected distance from the engaging ear, a clamping wall extending from the first mounting wall and curled back toward the first mounting wall, an elongate second mounting wall of a selected length extending from the clamping wall to the second end of the band, portions of the band intermediate the length of the second mounting wall being arched away from the first mounting wall, the second mounting wall being provided with a second mounting hole extending therethrough at a distance from the second end substantially equal to the distance between the engaging ear and the first mounting hole, the lengths of the clamping wall and the second mounting wall being selected such that the clamping wall securely clamps a piping/wiring member engaged therein when the second end of the band is engaged by the engaging ear and when the second mounting wall is urged from the arched configuration and into face to face contact with the first mounting wall.

2. A clamping device according to claim 1, wherein said band is made of an elastic metal.

3. A clamping device as in claim 1, wherein the clamping wall is curled into a substantially cylindrical shape for engaging a single piping/wiring member of substantially cylindrical cross-section.

4. A clamping device as in claim 1, wherein the clamping wall is curled into a non-cylindrical shape for clamping a plurality of elongate piping/wiring members in side-by-side relationship.

5. A clamping device as in claim 1 further comprising engaging means passing through the mounting holes of the first and second mounting walls for tightly retaining the second mounting wall in face to face contact with the first mounting wall.

6. A clamping device as in claim 1, wherein the first mounting wall is substantially planar.

* * * * *